United States Patent
Shimura et al.

(10) Patent No.: US 10,865,320 B2
(45) Date of Patent: *Dec. 15, 2020

(54) OIL-BASED INKJET INK

(71) Applicant: RISO KAGAKU CORPORATION, Tokyo (JP)

(72) Inventors: Shinichiro Shimura, Ibaraki (JP); Hikaru Sugiura, Ibaraki (JP); Shinsuke Ozawa, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 289 days.

This patent is subject to a terminal disclaimer.

(21) Appl. No.: 15/904,476

(22) Filed: Feb. 26, 2018

(65) Prior Publication Data

US 2018/0244936 A1 Aug. 30, 2018

(30) Foreign Application Priority Data

Feb. 28, 2017 (JP) .................. 2017-035942
Sep. 28, 2017 (JP) .................. 2017-188388

(51) Int. Cl.
C09D 11/36 (2014.01)
C09D 11/033 (2014.01)
C09D 11/037 (2014.01)
C09D 11/324 (2014.01)
C09D 11/102 (2014.01)

(52) U.S. Cl.
CPC ............ *C09D 11/36* (2013.01); *C09D 11/033* (2013.01); *C09D 11/037* (2013.01); *C09D 11/102* (2013.01); *C09D 11/324* (2013.01)

(58) Field of Classification Search
None
See application file for complete search history.

(56) References Cited

U.S. PATENT DOCUMENTS

| 4,338,133 | A | * | 7/1982 | Toyoda | C09D 11/36 106/31.58 |
|---|---|---|---|---|---|
| 5,968,244 | A | | 10/1999 | Ueda et al. | |
| 5,980,624 | A | | 11/1999 | Ichikawa et al. | |
| 6,113,679 | A | | 9/2000 | Adkins | |
| 7,834,072 | B2 | | 11/2010 | Carlini et al. | |
| 8,038,784 | B2 | | 10/2011 | Watanabe et al. | |
| 8,440,010 | B2 | | 5/2013 | Endo | |
| 8,507,585 | B2 | | 8/2013 | Hosoya et al. | |
| 9,624,394 | B2 | | 4/2017 | Endo et al. | |
| 9,624,402 | B2 | | 4/2017 | Shimura et al. | |
| 9,821,568 | B2 | | 11/2017 | Shimura | |
| 9,845,402 | B2 | | 12/2017 | Shimura et al. | |
| 2003/0220418 | A1 | * | 11/2003 | Horie | C09D 11/36 523/160 |
| 2004/0063811 | A1 | | 4/2004 | Horie et al. | |
| 2004/0068031 | A1 | * | 4/2004 | Horie | C09D 11/36 523/160 |
| 2004/0265756 | A1 | | 12/2004 | Horie | |
| 2005/0046675 | A1 | | 3/2005 | Aoshima | |
| 2005/0119363 | A1 | | 6/2005 | Yamada et al. | |
| 2006/0189712 | A1 | | 8/2006 | Kondo | |
| 2007/0022904 | A1 | | 2/2007 | Kitawaki et al. | |
| 2008/0194754 | A1 | * | 8/2008 | Nakamura | C09D 11/322 524/497 |
| 2009/0090271 | A1 | | 4/2009 | Wynants et al. | |
| 2009/0263632 | A1 | | 10/2009 | Kojima et al. | |
| 2010/0105807 | A1 | | 4/2010 | Sugita et al. | |
| 2010/0136234 | A1 | | 6/2010 | Kobayashi | |
| 2011/0232528 | A1 | | 9/2011 | Endo et al. | |
| 2012/0006225 | A1 | | 1/2012 | Tsukiana et al. | |
| 2012/0048141 | A1 | | 3/2012 | Arai et al. | |
| 2018/0244937 | A1 | | 8/2018 | Sugiura et al. | |
| 2018/0244938 | A1 | | 8/2018 | Morinaga et al. | |
| 2018/0244939 | A1 | | 8/2018 | Sugiura et al. | |
| 2018/0244940 | A1 | | 8/2018 | Ando et al. | |
| 2018/0244941 | A1 | | 8/2018 | Sugiura et al. | |
| 2018/0327617 | A1 | | 11/2018 | Inoue et al. | |
| 2019/0100002 | A1 | * | 4/2019 | Ozawa | C09D 11/033 |
| 2019/0100668 | A1 | * | 4/2019 | Ando | C09D 11/40 |
| 2019/0100671 | A1 | * | 4/2019 | Morinaga | C09D 11/54 |
| 2019/0134989 | A1 | | 5/2019 | Matsumoto et al. | |
| 2019/0300737 | A1 | * | 10/2019 | Ozawa | C09D 11/107 |
| 2020/0040206 | A1 | * | 2/2020 | Sugiura | C09D 11/36 |

FOREIGN PATENT DOCUMENTS

| AU | 2012247077 | B2 | 11/2012 |
|---|---|---|---|
| CN | 1576322 | A | 2/2005 |
| CN | 101027370 | A | 8/2007 |
| CN | 101652437 | A | 2/2010 |
| CN | 102199382 | A | 9/2011 |
| CN | 104610811 | A | 5/2015 |
| CN | 106084984 | A | 11/2016 |

(Continued)

OTHER PUBLICATIONS

English translation of JP 2016/196564, Nov. 2016; 29 pages.*
English translation of JPH 03/292370, Dec. 1991; 6 pages.*
English translation of JP 2001/098196, Apr. 2001; 12 pages.*
English translation of JP 01/203482, Aug. 1989; 6 pages.*
"Reactive and Nonreactive Silicone Fluid" from Shin-Etsu Chemical Co., Ltd., shinetsusilicone-global.com/catalog/pdf/modified_e.pdf, 2006; 10 pages.*
Official Communication issued in European Patent Office (EPO) Patent Application No. 18 158 557.1, dated Sep. 5, 2019.
European Search Report issued with respect to Application No. 18158552.2, dated May 17, 2018.
Jan. 11, 2019 Office Action in copending U.S. Appl. No. 15/904,496, filed Feb. 26, 2018.

(Continued)

*Primary Examiner* — Helene Klemanski

(74) *Attorney, Agent, or Firm* — Greenblum & Bernstein, P.L.C.

(57) ABSTRACT

An oil-based inkjet ink is disclosed, the oil-based inkjet ink containing a colorant and a non-aqueous solvent, wherein the non-aqueous solvent contains a silicone oil having a boiling point higher than 250° C. and a fatty acid ester-based solvent having 10 to 30 carbon atoms.

8 Claims, No Drawings

(56) References Cited

FOREIGN PATENT DOCUMENTS

| | | |
|---|---|---|
| EP | 1493783 A1 | 1/2005 |
| EP | 3093316 A1 | 11/2016 |
| EP | 3 366 737 | 8/2018 |
| EP | 3 366 739 | 8/2018 |
| EP | 3366733 | 8/2018 |
| EP | 3461868 | 4/2019 |
| JP | 01203482 A * | 8/1989 |
| JP | H03-292370 A | 12/1991 |
| JP | H04-161467 A | 6/1992 |
| JP | H04-248879 A | 9/1992 |
| JP | 2001-098196 A | 4/2001 |
| JP | 2001-342388 | 12/2001 |
| JP | 2004-217703 A | 8/2004 |
| JP | 2005-60567 A | 3/2005 |
| JP | 2006-307107 A | 11/2006 |
| JP | 2006-315363 A | 11/2006 |
| JP | 2007-154149 A | 6/2007 |
| JP | 2010001452 | 1/2010 |
| JP | 2010/064478 | 3/2010 |
| JP | 2014-19766 A | 2/2014 |
| JP | 2016-196564 A | 11/2016 |

OTHER PUBLICATIONS

European Search Report issued with respect to Application No. 18158568.8, dated May 24, 2018.
European Search Report issued with respect to Application No. 18158557.1, dated May 24, 2018.
European Search Report issued with respect to Application No. 18158565.4, dated Jun. 1, 2018.
European Search Report issued with respect to Application No. 18158577.9, dated Jun. 21, 2018.
European Search Report issued with respect to Application No. 18158573.8, dated Jul. 18, 2018.
Office Action in U.S. Appl. No. 15/904,496 dated Sep. 21, 2018.
English translation of JP 2006/307107, Nov. 2006; 28 pages.
"Phenyl Methyl Silicon Fluid" www.organosilicon.com/en/68083-14-7.htm, no date available; 1 page.
Mar. 11, 2020 Office Action in copending U.S. Appl. No. 15/904,478, filed Feb. 26, 2018.
"Silicone Fluid KF-96" from Shin-Etsu Chemical Co., Ltd.; shinetsusilicone-global.com/catalog/pdf/kf96_e.pdf. 2004; 36 pages.
Apr. 9, 2020 Office Action in copending U.S. Appl. No. 15/904,481, filed Feb. 26, 2018.
Apr. 13, 2020 Office Action in copending U.S. Appl. No. 15/904,504, filed Feb. 26, 2018.
English translation of JP 2004/217703, dated Aug. 2004; 9 pages.
Apr. 13, 2020 Office Action in copending U.S. Appl. No. 15/904,508, filed Feb. 26, 2018.
Apr. 15, 2020 Office Action in copending U.S. Appl. No. 16/141,054, filed Sep. 25, 2018.
Extended European Search Report from European Patent Office (EPO) in European Patent Appl. No. 18192237.8, dated Mar. 14, 2019.
English translation of JPH 04/248879, Sep. 1992; 13 pages.
Apr. 15, 2020 Office Action in copending U.S. Appl. No. 16/141,003, filed Sep. 25, 2018.
English translation of JP 2010/064478, Mar. 2010; 40 pages.
"Development of a Three-Dimensional Bioprinter: Construction of a Cell Supporting Structures Using Hydrogel and State-Of-The-Art Inkjet Technology" by Nishiyama et al.; J. Biomechanical Engineering, 131(3): 035001, Mar. 2009; 6 pages.
Catalogue of Organic Modified Silicone, Dow Corning Toray Co., Ltd., in Japanese, with English Translation of p. 10 (2016).
"Silicon Compounds: Silanes and Silicones," GELEST, A Survey of Properties and Chemistry, 3$^{rd}$ Edition, edited by Barry Arkles & Gerald L. Larson, Gelest, Inc. Morrisville, PA, 608 pages (2013).
Official Action dated Aug. 5. 2020 in the counterpart Chinese application No. 201810159232.X with translation.
Latest Practical Manual of Printing Technology, Letterpress Printing Technology Bulletin, Guangzhou, Tibet, page 119, Hefei: Anhui Audio-Visual Publishing House, Nov. 2003. See #1, the English translation of SIPO's Office Action at pp. 4-5 as a concise explanation of pertinence of this non-patent literature.
"Silicone Production and Application Technology", Institute of Scientific and Technological Information, Ministry of Chemical Industry, p. 86 Institute of Scientific and Technological Information, Ministry of Chemical Industry, Dec. 1985. See #1, the English translation of SIPO's Office Action at pp. 4-5 as a concise explanation of pertinence of this non-patent literature.
"Modern Fine Chemical Technology and Product Synthesis Processes", Kwong Shenglu, pp. 273-274, Beijing: Science and Technology Literature Publishing House, Dec. 1997. See #1, the English translation of SIPO's Office Action at pp. 4-5 as a concise explanation of pertinence of this non-patent literature.
Official Action dated Oct. 9, 2020 in the counterpart Chinese application No. 201810159076.7 (corresponding to U.S. Appl. No. 15/904,476).
Official Action dated Oct. 14, 2020 in the counterpart Chinese application No. 201810159427.4 (corresponding to U.S. Appl. No. 15/904,478) and its partial machine translation.
Official Action dated Oct. 14, 2020 in the counterpart Chinese application No. 201810161382.4 (corresponding to U.S. Appl. No. 15/904,481) and its partial machine translation.
"Industrial Plastics Dictionary", 1st edition, Su Jiaxai et al., p. 19, Chemical Industry Publishing Co., Ltd., release date: Dec. 31, 1989. See #2, the English translation of SIPO's Office Action as a concise explanation of pertinence of this non-patent literature.
Functional Polymer Materials (2nd Edition), Royal Construction, pp. 331 ~ 334, Doje University Press, release date: Jun. 30, 2014. See #2, and #3, the English translation of SIPO's Office Action as a concise explanation of pertinence of this non-patent literature.
Practical Manual For Cosmetics Raw Material Standards, 1st edition, China Flavored Cosmetics Industry Association, pp. 71 ~ 73, China Standard Publishing, release date Mar. 31, 2002. See #2, the English translation of SIPO's Office Action as a concise explanation of pertinence of this non-patent literature.
Overview Of The Chemical Industry, 1st edition, Peng Shishimatsu et al., pp. 280 ~ 282, Chemical Industry Publishing Company, release date: Jun. 30, 1989. See #3, the English translation of SIPO's Office Action as a concise explanation of pertinence of this non-patent literature.
Printing Material And Suitability,2nd Edition, Jiang Xuecheng et al., 99. 140 ~ 143, Tohoku University Press. Release Date: Aug. 31, 2016. See #3, the English translation of SIPO's Office Action as a concise explanation of pertinence of this non-patent literature.
Kako Encyclopedia (The Eighth Volume), 1st edition, Chemical Encyclopedia Editorial Department, pp. 957 ~ 958, Chemical Industry Publishing Company, release date Sep. 30, 1994. See #3, the English translation of SIPO's Office Action as a concise explanation of pertinence of this non-patent literature.

* cited by examiner

OIL-BASED INKJET INK

CROSS REFERENCE TO RELATED APPLICATIONS

This application is based upon and claims the benefit of priority from the prior Japanese Patent Application No. 2017-35942, filed on Feb. 28, 2017, the entire contents of which are incorporated by reference herein, and the prior Japanese Patent Application No. 2017-188388, filed on Sep. 28, 2017, the entire contents of which are incorporated by reference herein.

BACKGROUND OF THE INVENTION

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

When a printed item having an image formed using an oil-based inkjet ink is stored by insertion in a clear file formed from polypropylene (PP) or the like, a problem arises in that the clear file tends to deform. One reason for this deformation is that when the clear file contacts the printed surface, the ink components cause one surface of the clear file to swell.

JP 2007-154149 A proposes an inkjet non-aqueous ink composition having superior discharge stability that neither swells nor greatly deforms transparent files, the ink containing a pigment, a dispersant and a non-aqueous solvent, wherein at least 50% of the total weight of the non-aqueous solvent is composed of an ester-based solvent having at least 24 but not more than 36 carbon atoms.

JP 2004-217703 A proposes that by using an inkjet non-aqueous pigment ink containing a silicone-based solvent, a pigment, and a specific modified silicone oil as a dispersant, ink stability, nozzle blockages and clear file deformation can be improved.

JP H04-248879 A proposes that by using an inkjet recording ink containing, at least, 2 to 95 wt % of a silicone-based solvent with a boiling point of 100° C. to 250° C., and a colorant that is insoluble in the solvent, good print quality can be obtained regardless of the paper quality, satisfactory durability can be achieved several seconds after printing, and vivid images can be obtained with no color mixing in color images.

JP 2016-196564 A proposes that by using a non-aqueous inkjet ink composition containing a pigment, a non-aqueous solvent and a surfactant, wherein the surfactant contains a siloxane-based surfactant having an HLB value of at least 1.0 but not more than 7.0, the optical density of the image, and the discharge stability and storage stability of the ink can be improved.

SUMMARY OF THE INVENTION

An embodiment of the present invention provides an oil-based inkjet ink containing a colorant and a non-aqueous solvent, wherein the non-aqueous solvent contains a silicone oil having a boiling point higher than 250° C. and a fatty acid ester-based solvent having 10 to 30 carbon atoms.

DETAILED DESCRIPTION OF THE EMBODIMENTS

Embodiments of the present invention are described below, but the following embodiments in no way limit the present invention.

In the ink proposed in JP 2007-154149 A, at least 50% of the total weight of the non-aqueous solvent is composed of an ester-based solvent having at least 24 but not more than 36 carbon atoms. Because ester-based solvents having a high number of carbon atoms have comparatively high viscosities, inks using only this type of ester-based solvent tend to suffer from unsatisfactory discharge performance of the ink from the inkjet nozzles.

The inks proposed in JP 2004-217703 A and JP H04-248879 A use a silicone-based solvent, but these silicone-based solvents tend to increase ink wetting of the inkjet nozzle plate.

In JP 2016-196564 A, the siloxane-based surfactant is added to improve the pigment dispersion stability, and, therefore, the surfactant must have sufficient hydrophilic group portions to facilitate adsorption to the pigment surface, Accordingly, the siloxane-based surfactant of this document is not suited to the solvent. Further, the polyether-modified siloxane-based surfactant proposed in JP 2016-196564 A has high polarity, and is therefore not suited to the solvent.

An object of the present invention is to provide an oil-based inkjet ink that can prevent the deformation of clear files caused by printed items, improve the wetting characteristics of the ink on the nozzle plate, and improve the image density.

In the following description, the oil-based inkjet ink is sometimes referred to as simply "the ink".

The oil-based inkjet ink according to one embodiment contains a colorant and a non-aqueous solvent, wherein the non-aqueous solvent contains a silicone oil having a boiling point higher than 250° C. and a fatty acid ester-based solvent having 10 to 30 carbon atoms.

This oil-based inkjet ink can prevent the deformation of clear files caused by printed items, improve the wetting characteristics of the ink on the nozzle plate, and improve the image density.

When a printed item prepared using an oil-based ink is inserted in a clear file, and particularly a clear file composed of polypropylene (PP), the ink components of the printed item, and particularly the non-aqueous solvent components, tend to volatilize and make contact with the clear file, and can sometimes cause the inside surface of the clear file to degenerate considerably, and undergo either swelling or shrinking relative to the outside surface of the clear file, resulting in deformation of the clear file.

Among the various non-aqueous solvents used in oil-based inks, this type of deformation tends to occur more readily when the structure of a petroleum-based hydrocarbon solvent is similar to that of the polypropylene of the clear file. In a similar manner to petroleum-based hydrocarbon solvents, deformation of clear files can also occur for those fatty acid ester-based solvents, higher fatty acid-based solvents, and higher alcohol-based solvents and the like that have similar structures to polypropylene.

When a high-boiling point solvent is used in the ink, the non-aqueous solvent component can be prevented from volatilizing from the printed item, and clear file deformation can be prevented. However, high-boiling point solvents generally have high viscosities, and tend to cause poor ink dischargeability from the inkjet nozzles when used in inkjet inks.

Silicone oils can prevent clear file deformation while also exhibiting comparatively low viscosity.

On the other hand, silicone oils tend to increase ink wetting of the nozzle plate.

If the ink components penetrate into the recording medium such as paper, and cause a deterioration in the flatness of the printed surface of the recording medium, then the resulting irregular reflections can sometimes cause an apparent deterioration in the image density.

By using a silicone oil having a boiling point higher than 250° C. and a fatty acid ester-based solvent having 10 to 30 carbon atoms, clear file deformation caused by printed items can be prevented, the wetting characteristics of the ink on the nozzle plate can be improved, and the image density can be improved.

The reasons for these effects are thought to include those described below, but the scope of the present invention is in no way constrained by the following theories.

The silicone oil having a boiling point higher than 250° C. does not volatilize easily, and it is thought that retention of this solvent within the interior of the recording medium such as paper suppresses irregular reflection, enabling the image density to be improved. Further, it is thought that since the fatty acid ester-based solvent having 10 to 30 carbon atoms has at least 10 carbon atoms, the boiling point tends to be not too low, meaning the ink tends to be less likely to volatilize and the image density is less likely to deteriorate.

Furthermore, the fatty acid ester-based solvent having 10 to 30 carbon atoms tends to have a larger surface tension than the silicone oil having a boiling point higher than 250° C. Further, when the fatty acid ester-based solvent has 30 or fewer carbon atoms, the viscosity tends to be not too high, and as a result, the time taken for the ink to be repelled (the ink repellency time) tends to shorten. It is thought that as a result of these effects, ink wetting of the nozzle plate can be reduced, improving the wetting characteristics. By reducing ink wetting of the nozzle plate, adhesion of the ink to the nozzle plate can be prevented.

The ink may contain a pigment, a dye, or a combination of the two as the colorant.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

The dispersed form of the pigment may be, for example, a so-called encapsulated pigment in which the pigment is coated with an oil-insoluble resin, colored resin particles, or a dispersion in which the encapsulated pigment or colored resin particles are dispersed using a pigment dispersant, but a dispersion of a so-called self-dispersing pigment in which a functional group is chemically bonded to the pigment surface, or a dispersion obtained by adsorbing a pigment dispersant directly to the pigment surface is preferable.

From the viewpoints of discharge stability and storage stability, the average particle size of the pigment is preferably not more than 300 nm, more preferably not more than 200 nm, and even more preferably 150 nm or less.

The amount of the pigment is typically from 0.01 to 20% by mass of the total mass of the ink, and from the viewpoints of print density and ink viscosity, is preferably from 1 to 15% by mass, and more preferably from 5 to 10% by mass.

In order to ensure stable dispersion of the pigment in the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.; Solsperse 13940 (a polyester amine-based dispersant), 16000, 17000 and 18000 (fatty acid amine-based dispersants), and 11200, 24000 and 28000 (all product names), manufactured by The Lubrizol Corporation; Efka 400, 401, 402, 403, 450, 451 and 453 (modified polyacrylates) and Efka 46, 47, 48, 49, 4010 and 4055 (modified polyurethanes) (all product names), manufactured by BASF Japan Ltd.; Disparlon KS-860 and KS-873N4 (polyester amine salts) (both product names), manufactured by Kusumoto Chemicals, Ltd.; Discol 202, 206, OA-202 and OA-600 (multichain polymeric nonionic dispersants) (all product names), manufactured by DKS Co., Ltd.; DISPERBYK 2155 and 9077 (both product names). manufactured by BYK-Chemie Japan K.K.; and Hypermer KD2, KD3, KD11 and KD12 (all product names), manufactured by Croda Japan K.K.

The amount of the pigment dispersant need only be sufficient to enable satisfactory dispersion of the pigment within the ink, and may be set as appropriate. For example, the pigment dispersant is typically added in a mass ratio within a range from 0.1 to 5, and preferably from 0.1 to 1, relative to a value of 1 for the pigment. Further, the pigment dispersant is typically added in an amount of 0.01 to 10% by mass, and preferably from 0.01 to 5% by mass, relative to the total mass of the ink.

In an oil-based ink, the amount of resin components, including the pigment dispersant, relative to the total mass of the ink, is typically not more than 10% by mass, preferably not more than 7% by mass, and even more preferably 5% by mass or less. This may prevent any increase in the ink viscosity, and improve the discharge performance.

For the dye, any of the dyes typically used in this technical field may be used. In the case of an oil-based ink, the use of an oil-soluble dye is preferred, since, when a solvent exhibits better affinity with the non-aqueous solvent of the ink, good storage stability may be obtained.

Examples of oil-soluble dyes include azo dyes, metal complex salt dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metal phthalocyanine dyes. These dyes may be used individually, or a combination of two or more dyes may be used.

The amount of the dye is typically from 0.01 to 20% by mass relative to the total mass of the ink, and from the viewpoints of print density and ink viscosity, is preferably from 1 to 15% by mass, and more preferably from 5 to 10% by mass.

The ink preferably contains a silicone oil having a boiling point higher than 250° C.

From the viewpoint of improving the image density, the boiling point of the silicone oil is preferably higher than 250° C., more preferably 260° C. or higher, and even more preferably 270° C. or higher. The boiling point of the silicone oil may be typically not more than 400° C. In the following description, the silicone oil having a boiling point higher than 250° C. is sometimes referred to as "the silicone oil A".

There are no particular limitations on the silicone oil A, provided the boiling point is higher than 250° C., and compounds that have silicon atoms and carbon atoms in each molecule and are liquid at 23° C. can be used.

Compounds having a silyl group, compounds having a silyloxy group, and compounds having a siloxane linkage and the like can be used as the silicone oil A, and polysiloxane compounds can be used particularly favorably.

A chain-like silicone oil, a cyclic silicone oil, or a modified silicone oil or the like may be used as the silicone oil A.

The chain-like silicone oil is preferably a chain-like polysiloxane having 9 to 30 silicon atoms, more preferably 9 to 20 silicon atoms, and even more preferably 9 or 10 silicon atoms. Examples of the chain-like silicone oil include linear dimethyl silicone oils such as eicosamethylnonasiloxane and docosamethyldecasiloxane.

The cyclic silicone oil is preferably a cyclic polysiloxane of 7 to 9 silicon atoms, and cyclic dimethyl silicone oils such as tetradecamethylcycloheptasiloxane, hexadecamethylcyclooctasiloxane and octadecamethylcyclononasiloxane can be used favorably.

For the modified silicone oil, a silicone oil obtained by introducing any of various organic groups at a portion of the silicon atoms of a chain-like or cyclic dimethyl silicone oil can be used. In the modified silicone oil, it is preferable that all of the silicon atoms are bonded only to carbon atoms or oxygen atoms of siloxane linkages. The modified silicone oil is preferably an unreactive silicone oil. The modified silicone oil is preferably composed only of silicon atoms, carbon atoms, oxygen atoms and hydrogen atoms.

Examples of compounds that can be used as the modified silicone oil include compounds in which at least one methyl group within a chain-like or cyclic dimethyl silicone oil has been substituted with one or more groups selected from the group consisting of alkyl groups, carboxylate ester linkage-containing groups, aromatic ring-containing groups, and ether linkage-containing groups.

Examples of other compounds that can be used as the modified silicone oil include compounds in which at least one silicon atom contained in a chain-like or cyclic dimethyl silicone oil has been bonded, via an alkylene group, to a silicon atom of another chain-like or cyclic dimethyl silicone oil. In this case, at least one methyl group contained within the chain-like or cyclic dimethyl silicone oils that are linked via the alkylene group may be substituted with one or more groups selected from the group consisting of alkyl groups, carboxylate ester linkage-containing groups, aromatic ring-containing groups, and ether linkage-containing groups.

Examples of these modified silicone oils include alkyl-modified silicone oils, aryl-modified silicone oils such as phenyl-modified silicone oils and aralkyl-modified silicone oils, carboxylate ester-modified silicone oils, alkylene-modified silicone oils, and polyether-modified silicone oils.

The modified silicone oil preferably contains 2 to 20 silicon atoms, more preferably 2 to 10 silicon atoms, even more preferably 2 to 6 silicon atoms, and most preferably 3 to 6 silicon atoms.

In the modified silicone oil, examples of the organic groups that can be introduced at a silicon atom include those groups, mentioned within the following description of a modified silicone oil S, as examples of alkyl groups having at least 4 carbon atoms, carboxylate ester linkage-containing groups in which the total number of carbon atoms and oxygen atoms is at least 4, aromatic ring-containing groups having at least 6 carbon atoms, and alkylene groups having at least 4 carbon atoms.

Examples of compounds that can be used as the phenyl-modified silicone oils include methyl phenyl silicones such as diphenyl dimethicone, trimethylsiloxyphenyl dimethicone, diphenylsiloxyphenyl trimethicone, trimethylpentaphenyltrisiloxane, 1,1,1,5,5,5-hexamethyl-3-phenyl-3-(trimethylsilyloxy)trisiloxane, and 1,1,3,3-tetramethyl-1,3-diphenyldisiloxane.

Examples of the modified silicone oil include a silicone oil having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule. In the following description, this particular silicone oil is also referred to as the modified silicone oil S.

The modified silicone oil S may contain at least one group selected from the group consisting of groups (A) to (D) described below as the organic group in which the total number of carbon atoms and oxygen atoms is at least 4.

(A) Alkyl groups having at least 4 carbon atoms.

(B) Carboxylate ester linkage-containing groups in which the total number of carbon atoms and oxygen atoms is at least 4.

(C) Aromatic ring-containing groups having at least 6 carbon atoms.

(D) Alkylene groups having at least 4 carbon atoms.

For example, one or more compounds selected from the group consisting of compounds (A) to (D) described below can be used as the modified silicone oil S.

(A) Compounds having a main-chain siloxane linkage and an alkyl group having at least 4 carbon atoms, hereafter also referred to as alkyl-modified silicone oils S.

(B) Compounds having a main-chain siloxane linkage and a carboxylate ester linkage-containing group in which the total number of carbon atoms and oxygen atoms is at least 4, hereafter also referred to as ester-modified silicone oils S.

(C) Compounds having a main-chain siloxane linkage and an aromatic ring-containing group having at least 6 carbon atoms, hereafter also referred to as aryl-modified silicone oils S.

(D) Compounds having a siloxane linkage bonded to the carbon atom at one terminal of an alkylene group having at least 4 carbon atoms, and having a silyl group or a siloxane linkage bonded to the carbon atom at the other terminal of the alkylene group, hereafter also referred to as alkylene-modified silicone oils S.

In the modified silicone oil S, the total number of carbon atoms and oxygen atoms contained in all of the organic groups in which the total number of carbon atoms and oxygen atoms is at least 4 is preferably 4 or greater, more preferably 8 or greater, and even more preferably 10 or greater, in one molecule. This enables ink wetting of the nozzle plate to be further reduced.

In the modified silicone oil S, the total number of carbon atoms and oxygen atoms contained in all of the organic groups in which the total number of carbon atoms and oxygen atoms is at least 4 is preferably not more than 20, more preferably not more than 16, and even more preferably 12 or fewer, in one molecule. This enables the ink to have a lower viscosity, and can improve the discharge performance.

In those cases where one molecule of the modified silicone oil S contains two or more of the organic groups in which the total number of carbon atoms and oxygen atoms is at least 4, the total number of carbon atoms and oxygen atoms, in one molecule, that are contained within all of the organic groups in which the total number of carbon atoms and oxygen atoms is at least 4 refers to the total number of carbon atoms and oxygen atoms contained in the two or more organic groups which each have a total number of carbon atoms and oxygen atoms of at least 4.

From the viewpoint of preventing adhesion of the ink to the nozzle plate, the modified silicone oil S is preferably a compound in which the total number of carbon atoms and oxygen atoms, contained within all of the organic groups in which the total number of carbon atoms and oxygen atoms is at least 4, is from 4 to 12 within one molecule.

From the viewpoints of lowering the viscosity of the ink and improving the discharge performance, the modified silicone oil S is preferably a compound in which the total number of carbon atoms and oxygen atoms, contained within all of the organic groups in which the total number of carbon atoms and oxygen atoms is at least 4, is from 8 to 20 within one molecule.

Examples of the modified silicone oil S include silicone oils represented by general formula (X) shown below.

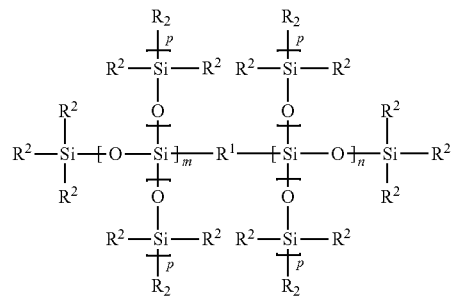

General formula (X)

In general formula (X), $R^1$ represents an oxygen atom or a divalent organic group having a carbon atom bonded directly to a silicon atom, each $R^2$ independently represents a monovalent organic group having a carbon atom bonded directly to a silicon atom, each of m and n independently represents an integer of 0 to 4, each p independently represents an integer of 0 to 2, the number of silicon atoms within one molecule is from 2 to 6, at least one of $R^1$ and $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X), it is preferable that $R^1$ is an oxygen atom, or a divalent organic group in which the total number of carbon atoms and oxygen atoms is at least 4, and each $R^2$ independently represents a methyl group, or a monovalent organic group in which the total number of carbon atoms and oxygen atoms is at least 4.

It is preferable that in general formula (X), $R^1$ is an oxygen atom or an alkylene group having at least 4 carbon atoms, and each $R^2$ independently represents a methyl group, an alkyl group having at least 4 carbon atoms, a carboxylate ester linkage-containing group in which the total number of carbon atoms and oxygen atoms is at least 4, or an aromatic ring-containing group having at least 6 carbon atoms, wherein at least one of $R^1$ and $R^2$ is a group selected from the group consisting of alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, and the total number of carbon atoms and oxygen atoms in one molecule that are contained within all of the alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, is from 4 to 20.

Other examples of the modified silicone oil S include silicone oils represented by general formula (X-1) shown below.

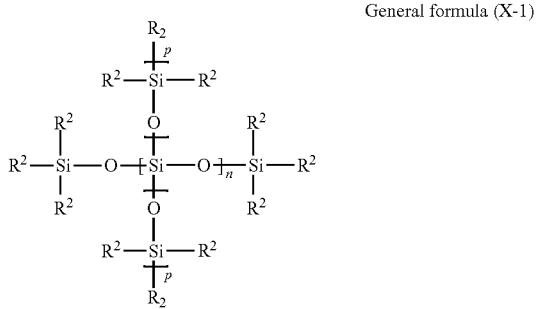

General formula (X-1)

In general formula (X-1), each $R^2$ independently represents a monovalent organic group having a carbon atom bonded directly to a silicon atom, n represents an integer of 0 to 4, each p independently represents 0 or 1, the number of silicon atoms within one molecule is from 2 to 6, at least one $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X-1), it is preferable that each $R^2$ independently represents a methyl group or a monovalent organic group in which the total number of carbon atoms and oxygen atoms is at least 4.

(A) Alkyl-Modified Silicone Oil S

One embodiment of the modified silicone oil S is a compound having 2 to 6 silicon atoms and an alkyl group having at least 4 carbon atoms, and is preferably a compound having a main-chain siloxane linkage, and an alkyl group having at least 4 carbon atoms in which a carbon atom is bonded directly to a silicon atom of the main chain (namely, an alkyl-modified silicone oil S).

By using this compound as an ink solvent, when a printed item is stored in a clear file, deformation of the clear file can be prevented.

The main-chain siloxane linkage of the alkyl-modified silicone oil S preferably contains 2 to 6 silicon atoms, more preferably 3 to 5 silicon atoms, and even more preferably 3 silicon atoms. For example, the main-chain siloxane linkage is preferably a trisiloxane (having 3 silicon atoms).

A branched chain such as a trimethylsilyloxy group may branch from the main-chain siloxane linkage as a side chain.

The alkyl group having at least 4 carbon atoms may be bonded to the silicon atom at either terminal or to the silicon atoms at both terminals of the main-chain siloxane linkage, may be bonded as a side chain, or may be introduced at one or both terminals and as a side chain.

Examples of the alkyl-modified silicone oil S are as described below in (1) to (4).

(1) Compounds having an alkyl group having at least 4 carbon atoms at one terminal of the main-chain siloxane linkage.

(2) Compounds having an alkyl group having at least 4 carbon atoms at each of the two terminals of the main-chain siloxane linkage.

(3) Compounds having a single alkyl group having at least 4 carbon atoms as a side chain on the main-chain siloxane linkage.

(4) Compounds having two or more alkyl groups having at least 4 carbon atoms as side chains on the main-chain siloxane linkage.

The alkyl group having at least 4 carbon atoms may have a straight chain or branched chain, and may be chain-like or alicyclic. The alkyl group having at least 4 carbon atoms preferably has 4 to 20 carbon atoms.

By ensuring that the number of carbon atoms in the alkyl group is at least 4, preferably at least 8, and even more preferably 10 or greater, the wetting characteristics of the ink on the nozzle plate can be further improved.

By ensuring that the number of carbon atoms in the alkyl group is not more than 20, preferably not more than 16, and even more preferably 12 or fewer, clear file deformation can be prevented, any increase in the ink viscosity can be suppressed, and the discharge performance can be improved.

Examples of the alkyl group having at least 4 carbon atoms include an n-butyl group, isobutyl group, tert-butyl group, pentyl group, hexyl group, heptyl group, octyl group, isooctyl group, nonyl group, decyl group, dodecyl group, hexadecyl group and eicosyl group.

Preferred groups include an octyl group, decyl group, dodecyl group and hexadecyl group, and a decyl group or dodecyl group is more preferred.

In the alkyl-modified silicone oil S, the total number of carbon atoms contained in all the alkyl groups of at least 4 carbon atoms in one molecule is preferably at least 4, more preferably at least 8, and even more preferably 10 or greater. This enables ink wetting of the nozzle plate surface to be further reduced.

In the alkyl-modified silicone oil S, the total number of carbon atoms contained in all the alkyl groups of at least 4 carbon atoms in one molecule is preferably not more than 20, more preferably not more than 16, and even more preferably 12 or fewer. This ensures a lower ink viscosity, meaning the discharge performance can be improved.

In those cases where one molecule of the alkyl-modified silicone oil S contains two or more alkyl groups of at least 4 carbon atoms, the total number of carbon atoms contained in all the alkyl groups of at least 4 carbon atoms in one molecule means the total number of carbon atoms in the two or more alkyl groups of at least 4 carbon atoms.

Examples of the alkyl-modified silicone oil S include compounds represented by general formula (A1) shown below.

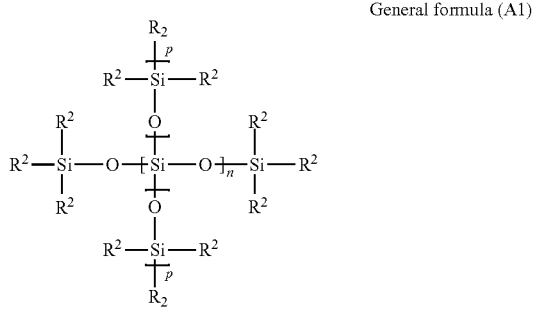

General formula (A1)

In general formula (A1), each $R^2$ independently represents a methyl group or an alkyl group having at least 4 carbon atoms, n represents an integer of 0 to 4, each p independently represents 0 or 1, the number of silicon atoms within one molecule is from 2 to 6, at least one $R^2$ is an alkyl group having at least 4 carbon atoms, and the total number of carbon atoms contained within all of the alkyl groups having at least 4 carbon atoms, is from 4 to 20 within one molecule.

In the alkyl-modified silicone oil S, the main chain preferably has 3 silicon atoms, and for example, a trisiloxane compound represented by general formula (A2) shown below can be used.

General formula (A2)

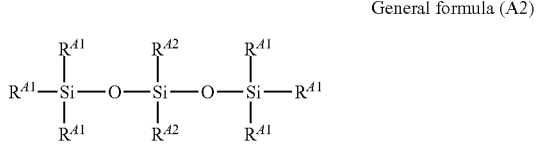

In general formula (A2), $R^{A1}$ represents a methyl group or an alkyl group having at least 4 carbon atoms, $R^{A2}$ represents a methyl group, an alkyl group having at least 4 carbon atoms or a trimethylsilyloxy group, at least one $R^{A1}$ or $R^{A2}$ represents an alkyl group having at least 4 carbon atoms, the $R^{A1}$ groups and $R^{A2}$ groups may all be the same, some may be different, or all may be mutually different, and the number of silicon atoms within one molecule is from 2 to 6.

For example, compounds represented by general formula (1) shown below can be used as the alkyl-modified silicone oil S.

(1)

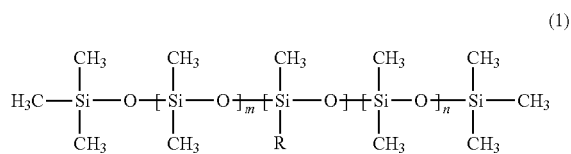

In general formula (1), R represents an alkyl group having 4 to 20 carbon atoms which has a straight chain or branched chain, and each of m and n independently represents an integer of 0 to 2, provided that m+n≤2.

In general formula (1), R represents an alkyl group having 4 to 20 carbon atoms which has a straight chain or branched chain. By ensuring that the number of carbon atoms in the alkyl group represented by R is at least 4, preferably at least 8, and even more preferably 10 or greater, the wetting characteristics of the ink on the nozzle plate can be further improved. In particular, a carbon number of 10 or greater increases the surface tension, thereby further improving the wetting characteristics.

By ensuring that the number of carbon atoms in the alkyl group represented by R is not more than 20, preferably not more than 16, and even more preferably 12 or fewer, clear file deformation can be prevented, any increase in the ink viscosity can be suppressed, and the discharge performance can be improved.

In general formula (1), examples of the alkyl group represented by R include an n-butyl group, isobutyl group, tert-butyl group, pentyl group, hexyl group, heptyl group, octyl group, isooctyl group, nonyl group, decyl group, dodecyl group, hexadecyl group and eicosyl group.

Preferred alkyl groups include an octyl group, decyl group, dodecyl group and hexadecyl group, and a decyl group or dodecyl group is more preferred.

The compound represented by general formula (1) is preferably a compound shown below in which both m and n are 0. R is as described above.

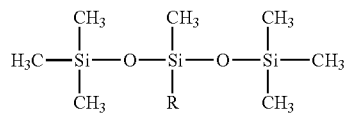

The alkyl-modified silicone oil S described above can be produced using the method described below, but the invention is not restricted to this particular method.

For example, an alkyl-modified silicone oil can be obtained by reacting a siloxane raw material and an alkene having at least 4 carbon atoms in an organic solvent. The siloxane raw material and the alkene are preferably reacted in a molar ratio within a range from 1:1 to 1:1.5. When two or more alkyl groups are to be introduced into the siloxane skeleton, the reaction is preferably performed with a molar ratio between the reactive groups in the siloxane raw material and the alkene that is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

For example, by reacting a compound of general formula (1) in which R represents a hydrogen atom as the siloxane raw material, and an alkene having a straight chain or branched chain of 4 to 20 carbon atoms in an organic solvent, a compound represented by general formula (1) can be obtained.

Examples of compounds that can be used as the siloxane raw material include 1,1,1,3,5,5,5-heptamethyltrisiloxane, 1,1,1,3,3,5,7,7,7-nonamethyltetrasiloxane, 1,1,1,3,3,5,7,7,9,9,9-undecamethylpentasiloxane, pentamethyldisiloxane, 1,1,3,3,5,5,5-heptamethyltrisiloxane, 1,1,3,3-tetramethyldisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,1,5,5,5-hexamethyl-3-(trimethylsilyloxy)trisiloxane, 1,1,1,5,5,5-hexamethyltrisiloxane, 1,1,1,3,5,7,7,7-octamethyltetrasiloxane, 1,1,3,5,5-pentamethyl-3-(dimethylsilyloxy)trisiloxane, and 1,1,3,3,5,5,7,7,9,9,11,11-dodecamethylhexasiloxane.

Examples of alkenes that may be used include 1-butene, 2-butene, 1-pentene, 1-hexene, 1-heptene, 1-octene, 2-octene, 1-nonene, 1-decene, 1-dodecene, 1-hexadecene and 1-eicosene.

Further, besides alkenes, alicyclic hydrocarbons having an ethylenic unsaturated double bond such as vinylcyclohexane can also be used.

(B) Ester-Modified Silicone Oil S

One embodiment of the modified silicone oil S is a compound having 2 to 6 silicon atoms and a carboxylate ester linkage-containing group in which the total number of carbon atoms and oxygen atoms is at least 4, and is preferably a compound having a main-chain siloxane linkage, and a carboxylate ester linkage-containing group in which a carbon atom is bonded directly to a silicon atom of the main chain and in which the total number of carbon atoms and oxygen atoms is at least 4 (namely, an ester-modified silicone oil S).

By using this compound as an ink solvent, when a printed item is stored in a clear file, deformation of the clear file can be prevented.

The main-chain siloxane linkage of the ester-modified silicone oil S preferably contains 2 to 6 silicon atoms, more preferably 2 to 5 silicon atoms, and even more preferably 3 to 5 silicon atoms. For example, the main-chain siloxane linkage is preferably a trisiloxane (having 3 silicon atoms).

A branched chain such as a trimethylsilyloxy group may branch from the main-chain siloxane linkage as a side chain.

The carboxylate ester linkage-containing group may be bonded to the silicon atom at either terminal or to the silicon atoms at both terminals of the main-chain siloxane linkage, may be bonded as a side chain, or may be introduced at one or both terminals and as a side chain.

A group represented by —$R^{Bb}$—O—(CO)—$R^{Ba}$ or a group represented by —$R^{Bb}$—(CO)—O—$R^{Ba}$, in which the carboxylate ester linkage is bonded to a silicon atom of the main-chain siloxane linkage via an alkylene group, can be used favorably as the carboxylate ester linkage-containing group.

Here, $R^{Ba}$ is preferably a chain-like or alicyclic alkyl group having at least 1 carbon atom which may have a straight chain or branched chain. $R^{Bb}$ is preferably a chain-like or alicyclic alkylene group having at least 1 carbon atom which may have a straight chain or branched chain. The alkylene group linking the silicon atom of the main-chain siloxane linkage and the carboxylate ester linkage more preferably has at least 2 carbon atoms.

The total number of carbon atoms and oxygen atoms in the carboxylate ester linkage-containing group is the total of the one carbon atom and two oxygen atoms in the ester linkage (—O—(CO)—), the number of carbon atoms in the alkyl group ($R^{Ba}$), and the number of carbon atoms in the alkylene group ($R^{Bb}$).

The total number of carbon atoms and oxygen atoms in the carboxylate ester linkage-containing group is preferably from 4 to 20.

By ensuring that the total number of carbon atoms and oxygen atoms in the carboxylate ester linkage-containing group is at least 4, preferably at least 8, and more preferably 10 or greater, the wetting characteristics of the ink on the nozzle plate can be further improved.

By ensuring that the total number of carbon atoms and oxygen atoms in the carboxylate ester linkage-containing group is not more than 20, preferably not more than 16, and even more preferably 12 or fewer, clear file deformation can be prevented, any increase in the ink viscosity can be suppressed, and the discharge performance can be improved.

In the carboxylate ester linkage-containing group, examples of the alkyl group ($R^{Ba}$) include a methyl group, ethyl group, propyl group, isopropyl group, n-butyl group, isobutyl group, tert-butyl group, pentyl group, hexyl group, heptyl group, octyl group, isooctyl group, nonyl group, decyl group, dodecyl group, hexadecyl group and heptadecyl group.

Preferred alkyl groups include a pentyl group, heptyl group, nonyl group and tridecyl group, and a heptyl group or nonyl group is more preferred.

In the carboxylate ester linkage-containing group, the alkylene group ($R^{Bb}$) is preferably a linear alkylene group having 1 to 8 carbon atoms, and examples include a methylene group, ethylene group, propylene group, trimethylene group, n-butylene group, isobutylene group, pentylene group, hexylene group, heptylene group, octylene group and isooctylene group. An ethylene group is preferred.

In the ester-modified silicone oil S, the total number of carbon atoms and oxygen atoms, contained in all the carboxylate ester linkage-containing groups in which the total number of carbon atoms and oxygen atoms is at least 4, is preferably at least 4 in one molecule, and is more preferably at least 8, and even more preferably 10 or greater, in one molecule. This enables ink wetting of the nozzle plate surface to be further reduced.

In the ester-modified silicone oil S, the total number of carbon atoms and oxygen atoms, contained in all the carboxylate ester linkage-containing groups in which the total number of carbon atoms and oxygen atoms is at least 4, is preferably not more than 20 in one molecule, more preferably not more than 16, and even more preferably 12 or fewer, in one molecule. This ensures a lower ink viscosity, meaning the discharge performance can be improved.

In those cases where one molecule of the ester-modified silicone oil S contains two or more carboxylate ester linkage-containing groups each having a total number of carbon atoms and oxygen atoms of at least 4, the total number of carbon atoms and oxygen atoms contained in all the carboxylate ester linkage-containing groups in one molecule means the total number of carbon atoms and oxygen atoms in the two or more carboxylate ester linkage-containing groups.

Examples of compounds that can be used favorably as the ester-modified silicone oil S include compounds of the above general formula (X-1) in which each $R^2$ independently represents a methyl group or a carboxylate ester linkage-containing group in which a carbon atom is bonded directly to a silicon atom and in which the total number of carbon atoms and oxygen atoms is at least 4, n represents an integer of 0 to 4, each p independently represents 0 or 1, the number of silicon atoms within one molecule is from 2 to 6, at least one $R^2$ is an aforementioned carboxylate ester linkage-containing group, and the total number of carbon atoms and oxygen atoms contained within all of the carboxylate ester linkage-containing groups within one molecule is from 4 to 20.

Examples of the ester-modified silicone oil S include compounds represented by general formula (B1) shown below.

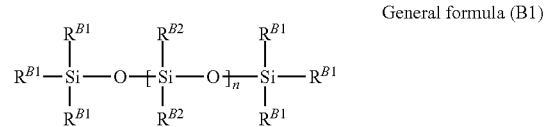

General formula (B1)

In general formula (B1), each $R^{B1}$ independently represents a methyl group or a carboxylate ester linkage-containing group in which a carbon atom is bonded directly to the silicon atom and in which the total number of carbon atoms and oxygen atoms is at least 4, each $R^{B2}$ independently represents a methyl group, a trimethylsilyloxy group, or a carboxylate ester linkage-containing group in which a carbon atom is bonded directly to the silicon atom and in which the total number of carbon atoms and oxygen atoms is at least 4, at least one $R^{B1}$ or $R^{B2}$ is an aforementioned carboxylate ester linkage-containing group in which the total number of carbon atoms and oxygen atoms is at least 4, n represents an integer of 0 to 4, and the number of silicon atoms within one molecule is from 2 to 6.

The carboxylate ester linkage-containing group is as described above.

The ester-modified silicone oil S described above can be produced using the method described below, but the invention is not restricted to this particular method.

For example, the ester-modified silicone oil S can be obtained by reacting a siloxane raw material and a vinyl ester of an aliphatic acid or an allyl ester of an aliphatic acid in which the total number of carbon atoms and oxygen atoms is at least 4 in an organic solvent. The siloxane raw material and the vinyl ester of an aliphatic acid or allyl ester of an aliphatic acid are preferably reacted with a molar ratio between the reactive group in the siloxane raw material and the vinyl ester of an aliphatic acid or allyl ester of an aliphatic acid that is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil S can be used.

Examples of vinyl esters of aliphatic acids that may be used include vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate and vinyl eicosanoate.

An example of an allyl ester of an aliphatic acid that may be used is allyl hexanoate.

(C) Aryl-Modified Silicone Oil S

One embodiment of the modified silicone oil S is a compound having 2 to 6 silicon atoms and an aromatic ring-containing group having a total number of carbon atoms of at least 6, and is preferably a compound having a main-chain siloxane linkage, and an aromatic ring-containing group in which a carbon atom is bonded directly to a silicon atom of the main chain and in which the total number of carbon atoms is at least 6 (namely, an aryl-modified silicone oil S).

By using this compound as an ink solvent, when a printed item is stored in a clear file, deformation of the clear file can be prevented.

Aromatic rings have higher boiling points than linear alkanes having the same number of carbon atoms, and are less likely to volatilize. Moreover, in the aryl-modified silicone oil S, because an aromatic ring that is bulkier than an alkyl group exists within the molecule, following printing of the ink to a recording medium, even if the solvent component were to volatilize from the printed item while stored in a clear file, permeation of the solvent component into the clear file is less likely, meaning deformation of the clear file can be further reduced.

The siloxane linkage of the main chain of the aryl-modified silicone oil S preferably contains 2 to 6 silicon atoms, more preferably 3 to 5 silicon atoms, and most preferably 3 silicon atoms. For example, the main-chain siloxane linkage is preferably a trisiloxane (having 3 silicon atoms).

A branched chain such as a trimethylsilyloxy group may branch from the main-chain siloxane linkage as a side chain.

The aromatic ring-containing group may be bonded to the silicon atom at either terminal or to the silicon atoms at both terminals of the main-chain siloxane linkage, may be bonded as a side chain, or may be introduced at one or both terminals and as a side chain.

A group represented by $-R^{Ca}$ in which the aromatic ring is bonded directly to a silicon atom of the main-chain siloxane linkage, or a group represented by $-R^{Cb}-R^{Ca}$, in which the aromatic ring is bonded to a silicon atom of the main-chain siloxane linkage via an alkylene group, can be used favorably as the aromatic ring-containing group.

Here, $R^{Ca}$ is preferably an aromatic ring having at least 6 carbon atoms. $R^{Cb}$ is preferably a chain-like or alicyclic alkylene group having at least 1 carbon atom which may have a straight chain or branched chain.

When the aromatic ring-containing group is a group represented by $-R^{Ca}$ in which the aromatic ring is bonded directly to a silicon atom of the main-chain siloxane linkage, it is preferable that a branched chain such as a trimethylsilyloxy group branches from the main-chain siloxane linkage as a side chain.

The number of carbon atoms in the aromatic ring-containing group is the total of the number of carbon atoms in the aromatic ring ($R^{Ca}$) and the number of carbon atoms in the optional alkylene group ($R^{Cb}$).

The number of carbon atoms in the aromatic ring-containing group is preferably from 6 to 20.

By ensuring that the number of carbon atoms in the aromatic ring-containing group is at least 6, preferably at least 8, and more preferably 10 or greater, the wetting characteristics of the ink on the nozzle plate can be further improved.

By ensuring that the number of carbon atoms in the aromatic ring-containing group is not more than 20, preferably not more than 16, and more preferably 12 or fewer, clear file deformation can be prevented, any increase in the ink viscosity can be suppressed, and the discharge performance can be improved.

In the aromatic ring-containing group, examples of the aromatic ring portion ($R^{Ca}$) include a phenyl group, tolyl group, xylyl group, trimethylphenyl group, biphenylyl group, naphthyl group or anthracenyl group, or a functional group in which at least one hydrogen atom of one of these groups has been substituted with an alkyl group.

The aromatic ring-containing group may contain one, or two or more aromatic rings, but the total number of carbon atoms in all of the aromatic ring-containing groups of at least 6 carbon atoms in one molecule is preferably from 6 to 20.

In the aromatic ring-containing group, the optional alkylene group ($R^{Cb}$) is preferably an alkylene group having 1 to 8 carbon atoms that may have a straight chain or a branched chain, and examples include a methylene group, ethylene group, propylene group, trimethylene group, n-butylene group, isobutylene group, pentylene group, hexylene group, heptylene group, octylene group and isooctylene group.

A propylene group, methylethylene group or ethylene group is preferred.

In the aryl-modified silicone oil S, the total number of carbon atoms contained in all the aromatic ring-containing groups of at least 6 carbon atoms in one molecule is preferably at least 6, more preferably at least 8, and even more preferably 10 or greater. This enables ink wetting of the nozzle plate surface to be further reduced.

In the aryl-modified silicone oil S, the total number of carbon atoms contained in all the aromatic ring-containing groups of at least 6 carbon atoms in one molecule is preferably not more than 20, more preferably not more than 16, and even more preferably 12 or fewer. This ensures a lower ink viscosity, meaning the discharge performance can be improved.

In those cases where one molecule of the aryl-modified silicone oil S contains two or more aromatic ring-containing groups of at least 6 carbon atoms, the total number of carbon atoms contained in all the aromatic ring-containing groups of at least 6 carbon atoms in one molecule means the total number of carbon atoms in the two or more aromatic ring-containing groups of at least 6 carbon atoms.

Examples of compounds that can be used favorably as the aryl-modified silicone S include compounds of the above general formula (X-1) in which each $R^2$ independently represents a methyl group or an aromatic ring-containing group having at least 6 carbon atoms in which a carbon atom is bonded directly to the silicon atom, n represents an integer of 0 to 4, each p independently represents 0 or 1, the number of silicon atoms within one molecule is from 2 to 6, at least one $R^2$ is an aforementioned aromatic ring-containing group, and the total number of carbon atoms contained within all of the aromatic ring-containing groups within one molecule is from 6 to 20.

Examples of the aryl-modified silicone S include compounds represented by general formula (C1) shown below.

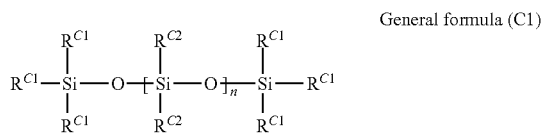

General formula (C1)

In general formula (C1), each $R^{C1}$ independently represents a methyl group or an aromatic ring-containing group having at least 6 carbon atoms in which a carbon atom is bonded directly to the silicon atom, each $R^{C2}$ independently represents a methyl group, a trimethylsilyloxy group, or an aromatic ring-containing group having at least 6 carbon atoms in which a carbon atom is bonded directly to the silicon atom, at least one $R^{C1}$ or $R^{C2}$ is an aforementioned aromatic ring-containing group having at least 6 carbon atoms, n represents an integer of 0 to 4, and the number of silicon atoms within one molecule is from 2 to 6.

The aromatic ring-containing group is as described above.

The aryl-modified silicone oil S described above can be produced using the method described below, but the invention is not restricted to this particular method.

For example, an aryl-modified silicone oil S can be obtained by reacting a siloxane raw material and an aryl compound of 6 to 20 carbon atoms having a carbon double bond in an organic solvent. The siloxane raw material and the aryl compound are preferably reacted with a molar ratio between the reactive group in the siloxane raw material and the carbon double bond in the aryl compound that is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil S can be used.

Examples of aryl compounds having a carbon double bond that may be used include styrene, 4-methylstyrene, 2-methylstyrene, 4-tert-butylstyrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenylethylene, triphenylethylene, 2,4,6-trimethylstyrene, cis-β-methylstyrene, and trans-β-methylstyrene.

(D) Alkylene-Modified Silicone Oil S

One embodiment of the modified silicone oil S is a compound having 2 to 6 silicon atoms and an alkylene group having at least 4 carbon atoms, and is preferably a compound having a siloxane linkage bonded to the carbon atom at one terminal of an alkylene group having at least 4 carbon atoms, and having a silyl group or a siloxane linkage bonded to the carbon atom at the other terminal of the alkylene group (namely, an alkylene-modified silicone oil S).

By using this compound as an ink solvent, when a printed item is stored in a clear file, deformation of the clear file can be prevented.

The alkylene-modified silicone oil S preferably contains 2 to 6 silicon atoms, more preferably 3 to 5 silicon atoms, and even more preferably 4 silicon atoms.

In the alkylene-modified silicone oil S, the silyl group or siloxane linkage at one terminal of the alkylene group preferably contains 1 to 5 silicon atoms, more preferably 1 to 4 silicon atoms, and even more preferably 2 or 3 silicon atoms.

When the alkylene-modified silicone oil S has a siloxane linkage having 3 or more silicon atoms at one terminal of the alkylene group, a branched chain such as a trimethylsilyloxy group may branch from the main-chain siloxane linkage as a side chain.

The alkylene group having at least 4 carbon atoms may have a straight chain or branched chain, and may be chain-like or alicyclic. The alkylene group having at least 4 carbon atoms preferably has 4 to 20 carbon atoms.

By ensuring that the number of carbon atoms in the alkylene group is at least 4, and preferably at least 8, the wetting characteristics of the ink on the nozzle plate can be further improved.

By ensuring that the number of carbon atoms in the alkylene group is not more than 20, preferably not more than 12, and even more preferably 10 or fewer, clear file deformation can be prevented, any increase in the ink viscosity can be suppressed, and the discharge performance can be improved.

Examples of the alkylene group having at least 4 carbon atoms include an n-butylene group, isobutylene group, pentylene group, hexylene group, heptylene group, octylene group, isooctylene group, nonylene group, decylene group, dodecylene group, hexadecylene group and eicosylene group. An octylene group, decylene group or dodecylene group is preferred, and an octylene group or decylene group is more preferred.

Examples of compounds that can be used favorably as the alkylene-modified silicone S include compounds of the above general formula (X) in which $R^1$ represents an alkylene group having at least 4 carbon atoms, $R^2$ represents a methyl group, each of m and n independently represents an integer of 0 to 4, each p independently represents an integer of 0 to 2, and the number of silicon atoms within one molecule is from 2 to 6.

Examples of the alkylene-modified silicone oil S include compounds represented by general formula (D1) shown below.

General formula (D1)

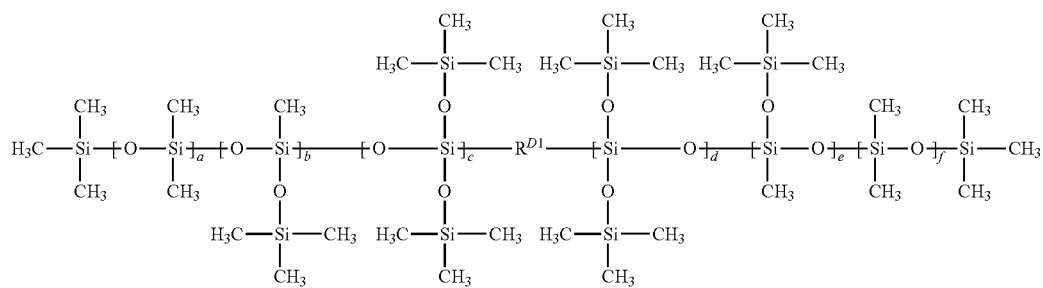

In general formula (D1), $R^{D1}$ represents an alkylene group having at least 4 carbon atoms, each of a and f independently represents an integer of 0 to 2, each of b and e independently represents an integer of 0 or 1, and each of c and d independently represents an integer of 0 or 1, provided that a+b+c≤2 and d+e+f≤2, and the number of silicon atoms within one molecule is from 2 to 6.

In general formula (D1), it is preferable that 1≤a+b+c≤2 and 1≤d+e+f≤2.

Further, in general formula (D1), it is preferable that $R^{D1}$ is an alkylene group having 8 to 10 carbon atoms.

The alkylene-modified silicone oil S described above can be produced using the method described below, but the invention is not restricted to this particular method.

For example, an alkylene-modified silicone oil S can be obtained by reacting a siloxane raw material and a diene compound having 4 to 20 carbon atoms in an organic solvent. The siloxane raw material and the diene compound are preferably reacted in a molar ratio within a range from 2:1 to 3:1. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil S can be used.

Examples of diene compounds that may be used include 1,3-butadiene, 1,3-pentadiene, 1,4-pentadiene, 1,5-hexadiene, 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

Commercially available products may be used as the silicone oil A, and examples of products that may be used include alkyl-modified silicone oils such as "FZ-3196" manufactured by Dow Corning Toray Co., Ltd., and aryl-modified silicone oils such as 1,1,1,5,5,5-hexamethyl-3-phenyl-3-(trimethylsilyloxy)trisiloxane and 1,1,3,3-tetramethyl-1,3-diphenyldisiloxane manufactured by Tokyo Chemical Industry Co., Ltd.

The silicone oil A preferably contains an alkyl-modified silicone oil. The alkyl-modified silicone oil can further improve the wetting characteristics of the ink on the nozzle plate by increasing the surface tension of the ink. The alkyl-modified silicone oil may be selected, for example, from among silicone oils in which one or more alkyl groups have been introduced at a portion of the silicon atoms of a chain-like or cyclic dimethyl silicone oil, and modified silicone oils S having an alkyl group having at least 4 carbon atoms as the organic group in which the total number of carbon atoms and oxygen atoms is at least 4.

The alkyl-modified silicone oil preferably contains a silicone oil having an alkyl group having at least 4 carbon atoms.

A single silicone oil A may be used alone, or a combination of a plurality of silicone oils may be used.

From the viewpoint of further enhancing the clear file deformation prevention effect, the amount of the silicone oil A in the ink, relative to the total mass of non-aqueous solvent in the ink, is preferably at least 5% by mass, more preferably at least 10% by mass, even more preferably at least 15% by mass, even more preferably at least 20% by mass, even more preferably at least 25% by mass, even more preferably at least 40% by mass, and even more preferably 55% by mass or greater.

The amount of the silicone oil A in the ink, relative to the total mass of non-aqueous solvent in the ink, may be, for example, not more than 95% by mass, not more than 85% by mass, not more than 80% by mass, or 55% by mass or less.

The amount of the silicone oil A relative to the total mass of the ink varies depending on the total amount of non-aqueous solvent used, but from the viewpoint of further enhancing the clear file deformation prevention effect, the amount of the silicone oil A is preferably at least 5% by mass, more preferably at least 10% by mass, even more preferably at least 25% by mass, even more preferably at least 40% by mass, and even more preferably 55% by mass or greater.

The amount of the silicone oil A relative to the total mass of the ink may be, for example, not more than 90% by mass, or 80% by mass or less.

The ink preferably contains a fatty acid ester-based solvent having 10 to 30 carbon atoms.

From the viewpoint of improving the image density, the number of carbon atoms in the fatty acid ester-based solvent is preferably at least 10, more preferably at least 12, and even more preferably 14 or greater.

From the viewpoint of improving the wetting characteristics of the ink on the nozzle plate, the number of carbon atoms in the fatty acid ester-based solvent is preferably not more than 30, more preferably not more than 28, and even more preferably 26 or fewer.

The number of carbon atoms in the fatty acid ester-based solvent is, for example, preferably from 12 to 28, and more preferably from 14 to 28.

A compound that is liquid at 23° C. is preferred as the fatty acid ester-based solvent.

Examples of the fatty acid ester-based solvent having 10 to 30 carbon atoms include isononyl isononanoate, isodecyl isononanoate, isotridecyl isononanoate, methyl laurate, isopropyl laurate, hexyl laurate, isopropyl myristate, isopropyl palmitate, hexyl palmitate, isooctyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate and 2-hexyldecyl myristate.

The boiling point of the fatty acid ester-based solvent is preferably at least 150° C., more preferably at least 200° C., and even more preferably 250° C. or higher. These non-aqueous solvents having a boiling point of 250° C. or higher also include non-aqueous solvents that do not exhibit an actual boiling point.

A single fatty acid ester-based solvent having 10 to 30 carbon atoms may be used alone, or a combination of a plurality of these solvents may be used.

From the viewpoint of further enhancing the effect of the ink in improving the wetting characteristics of the ink on the nozzle plate, the amount of the fatty acid ester-based solvent having 10 to 30 carbon atoms in the ink, relative to the total mass of non-aqueous solvent in the ink, is preferably at least 5% by mass, more preferably at least 10% by mass, even more preferably at least 15% by mass, and even more preferably 20% by mass or greater.

The amount of the fatty acid ester-based solvent having 10 to 30 carbon atoms in the ink, relative to the total mass of non-aqueous solvent in the ink, may be, for example, not more than 90% by mass, not more than 80% by mass, or 45% by mass or less.

The amount of the fatty acid ester-based solvent having 10 to 30 carbon atoms relative to the total mass of the ink varies depending on the total amount of non-aqueous solvent used, but from the viewpoint of further enhancing the effect of the ink in improving the wetting characteristics of the ink on the nozzle plate, the amount of the fatty acid ester-based solvent having 10 to 30 carbon atoms is preferably at least 5% by mass, more preferably at least 10% by mass, even more preferably at least 15% by mass, and even more preferably 20% by mass or greater.

The amount of the fatty acid ester-based solvent having 10 to 30 carbon atoms relative to the total mass of the ink may be, for example, not more than 80% by mass, and may be 70% by mass or less.

There are no particular limitations on the combined total of the amount of the silicone oil A and the amount of the fatty acid ester-based solvent having 10 to 30 carbon atoms in the ink. Examples include combinations in which the amount of the silicone oil A, relative to the total mass of non-aqueous solvent in the ink, is at least 5% by mass (preferably at least 10% by mass, more preferably at least 15% by mass, even more preferably at least 20% by mass, even more preferably at least 25% by mass, even more preferably at least 40% by mass, and even more preferably 55% by mass or greater), and the amount of the fatty acid ester-based solvent having 10 to 30 carbon atoms, relative to the total mass of non-aqueous solvent in the ink, is at least 5% by mass (preferably at least 10% by mass, more preferably at least 15% by mass, and even more preferably 20% by mass or greater).

The ink may also contain other non-aqueous solvents.

Both non-polar organic solvents and polar organic solvents can be used as these other non-aqueous solvents. In the embodiments of the present invention, a water-insoluble organic solvent that does not mix uniformly with an equal volume of water at 1 atmosphere and 20° C. is preferably used as this other non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents besides the fatty acid ester-based solvent having 10 to 30 carbon atoms, higher alcohol-based solvents and higher fatty acid-based solvents.

Specific examples include fatty acid ester-based solvents having at least 31 carbon atoms such as isostearyl palmitate;

higher alcohol-based solvents having at least 6 carbon atoms, and preferably 12 to 20 carbon atoms, within one molecule, such as isomyristyl alcohol, isopalmityl alcohol, isostearyl alcohol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents besides the fatty acid ester-based solvent having 10 to 30 carbon atoms, the higher alcohol-based solvents and the higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase.

In addition to the various components described above, the oil-based ink may also include various additives, provided these additives do not impair the effects of the present invention. For example, additives such as nozzle blockage inhibitors, antioxidants, conductivity modifiers, viscosity modifiers, surface tension regulators, and oxygen absorbers and the like may be added as appropriate. There are no particular limitations on these additives, and materials typically used in this technical field may be used.

The ink can be produced by mixing the various components including the colorant and the non-aqueous solvent. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and even more preferably about 10 mPa·s.

There are no particular limitations on the printing method used with the inkjet ink, and any of various printing systems, including a piezo system, electrostatic system or thermal system may be used, but a piezo system is preferred. In those cases where an inkjet recording device is used, the ink of the present invention is preferably discharged from the inkjet head based on a digital signal, with the discharged ink droplets being adhered to a recording medium.

In the embodiments of the present invention, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several µm to several tens of µm are formed with a spacing between fibers of several tens to several hundred µm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. The present invention is in no way limited by the following examples.

<Synthesis of Alkyl-Modified Silicone Oils>

A synthesis method for an alkyl-modified silicone oil 1 and an alkyl-modified silicone oil 2 is described below. The formulations of the alkyl-modified silicone oil 1 and the alkyl-modified silicone oil 2 are shown in Table 1.

The alkyl-modified silicone oil 1 is an alkyl-modified silicone oil of general formula (1) in which m+n=0 and the number of carbon atoms in R (the C number)=12, and was synthesized in the manner described below.

A four-necked flask was charged with 50 parts by mass of hexane, 10 parts by mass of 1,1,1,3,5,5,5-heptamethyltrisiloxane, and 8.3 parts by mass of 1-dodecene. Subsequently, 0.02 parts by mass of a platinum catalyst (1,3-divinyl-1,1,3,3-tetramethyldisiloxane platinum complex, manufactured by Sigma-Aldrich Corporation) was added dropwise to the flask, and the resulting mixture was stirred at room temperature for 2 to 3 hours. The reaction solvent (hexane) and any unreacted raw materials were then removed by distillation under reduced pressure to obtain the target substance.

The alkyl-modified silicone oil 2 is an alkyl-modified silicone oil of general formula (1) in which m+n=0 and the number of carbon atoms in R (the C number)=20, and with the exception of mixing the siloxane compound and an alkene in the formulation shown in Table 1, was synthesized using the same method as described above.

In the synthesis of each of the alkyl-modified silicones, mixing was performed so that the molar ratio between the siloxane compound and the alkene was 1:1.1.

The 1,1,1,3,5,5,5-heptamethyltrisiloxane and the alkenes shown in Table 1 can be obtained from Tokyo Chemical Industry Co., Ltd.

TABLE 1

|  | Siloxane compound Raw material | (parts by mass) Amount | Alkene Raw material | (parts by mass) Amount |
|---|---|---|---|---|
| Alkyl-modified silicone oil 1 | 1,1,1,3,5,5,5-heptamethyltrisiloxane | 10 | 1-dodecene | 8.3 |
| Alkyl-modified silicone oil 2 | 1,1,1,3,5,5,5-heptamethyltrisiloxane | 10 | 1-eicosene | 13.9 |

<Preparation of Inks>

Ink formulations are shown in Tables 2 and 3. The formulation of the solvent used in each ink is also shown in each table.

The pigments, pigment dispersants, and the various solvents shown in each of the tables were mixed together in accordance with the amounts shown in each table, and the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

The materials used were as follows.
(Pigments)

Carbon black 1: MA77, manufactured by Mitsubishi Chemical Corporation

Carbon black 2: #40, manufactured by Mitsubishi Chemical Corporation
(Pigment Dispersants)

Solsperse 18000: a fatty acid amine-based dispersant, manufactured by The Lubrizol Corporation, effective component: 100% by mass Solsperse 13940: a polyester amine-based dispersant, manufactured by The Lubrizol Corporation, effective component: 40% by mass
(Silicone Oils)

Alkyl-modified silicone oil 1: an alkyl-modified silicone oil synthesized using the method described above Alkyl-modified silicone oil 2: an alkyl-modified silicone oil synthesized using the method described above Aryl-modified silicone oil: 1,1,3,3-tetramethyl-1,3-diphenyldisiloxane, manufactured by Tokyo Chemical Industry Co., Ltd.

Dimethyl silicone: KF-96L-2CS, a chain-like silicone oil, manufactured by Shin-Etsu Chemical Co., Ltd.
(Fatty Acid Ester-Based Solvents)

Methyl laurate: manufactured by Tokyo Chemical Industry Co., Ltd.

Isooctyl stearate: NIKKOL STO, manufactured by Nikko Chemicals Co., Ltd.

2-hexyldecyl myristate: ICM-R, manufactured by Kokyu Alcohol Kogyo Co., Ltd.

Ethyl heptanoate: manufactured by Tokyo Chemical Industry Co., Ltd.

Isostearyl palmitate: NIKKOL ISPV, manufactured by Nikko Chemicals Co., Ltd.
<Evaluations>

The inks from each of the examples and comparative examples described above were evaluated using the methods described below. The evaluation results are shown in Tables 2 and 3.
(Waviness of Clear File)

Evaluation of clear file waviness was performed by inserting a single printed item in a PP (polypropylene) clear file, leaving the clear file to stand, and after one week, ascertaining the amount of deformation in the clear file. The thickness of a single clear file sheet was 0.2 mm.

The printed item was prepared by loading the ink into a line-type inkjet printer "ORPHIS EX9050" (manufactured by RISO KAGAKU CORPORATION), and printing a solid image of about 51 mm in the main scanning direction (600 nozzles)×260 mm in the sub-scanning direction onto one side of a plain paper "RISO Paper Thin Type" (manufactured by RISO KAGAKU CORPORATION).

The amount of deformation in the clear file was determined by laying the clear file on a flat surface, and measuring the maximum height that the clear file had been deformed and lifted from the flat surface. The evaluation criteria were as follows.

S1: the amount of deformation of the clear file is less than 0.5 cm

S2: the amount of deformation of the clear file is at least 0.5 cm but less than 1 cm A: the amount of deformation of the clear file is at least 1 cm but less than 5 cm B: the amount of deformation of the clear file is at least 5 cm
(Wetting Characteristics of Ink on Nozzle Plate)

Each ink was placed in a 30 ml glass container, one end of a nozzle plate (length 5 cm×width 5 mm) used in an inkjet printer "ORPHIS EX9050" (a product name, manufactured by RISO KAGAKU CORPORATION) was grasped with a set of tweezers, and the opposite end of the nozzle plate was immersed in the ink to a depth of 2 cm for 5 seconds. Subsequently, the nozzle plate was pulled rapidly out of the ink, and the time t taken for the residual ink film on the nozzle plate to form ink droplets was measured. The same operation was repeated 10 times using the same nozzle plate, and the value of t was measured for each repetition. The average of the 10 t values was calculated and recorded as the ink repellency time. Using this ink repellency time, the wetting characteristics of the ink on the nozzle plate were evaluated against the following criteria.

S: Ink Repellency Time of Less than 3 Seconds.

A: ink repellency time of at least 3 seconds but less than 5 seconds

B: ink repellency time of at least 5 seconds
(Image Density)

Each of the inks described above was mounted in the line-type inkjet printer "ORPHIS EX9050" (manufactured by RISO KAGAKU CORPORATION), and a printed item was obtained by printing one copy of a solid image onto a plain paper "RISO Paper Thin Type" (manufactured by RISO KAGAKU CORPORATION). The printing was performed at a resolution of 300×300 dpi, under discharge conditions including an ink volume per dot of 42 pl.

After standing for one day, the image density (surface density) of the solid image portion of the obtained printed item was measured, and the measured value was evaluated against the following evaluation criteria. Measurement of the image density was performed using a Macbeth densitometer RD-918 (manufactured by Sakata Inx Corporation).

A: OD value of 1.05 or greater

B: OD value of greater than 1.00 but less than 1.05

C: OD value of 1.00 or less

TABLE 2

| | Units: % by mass | Example 1 | Example 2 | Example 3 | Example 4 | Example 5 | Example 6 | Example 7 | Example 8 | Example 9 |
|---|---|---|---|---|---|---|---|---|---|---|
| Pigments | Carbon black 1 | 5 | 5 | 5 | 5 | 5 | 5 | 5 | 5 | |
| | Carbon black 2 | | | | | | | | | 5 |
| Pigment dispersants | Solsperse 18000 | 5 | 5 | 5 | 5 | 5 | 5 | 5 | 5 | |
| | Solsperse 13940 | | | | | | | | | 5 |
| | Solvent | 90 | 90 | 90 | 90 | 90 | 90 | 90 | 90 | 90 |
| | Total (% by mass) | 100 | 100 | 100 | 100 | 100 | 100 | 100 | 100 | 100 |

TABLE 2-continued

| Units: % by mass | | Boiling point | Carbon number (*1) | Example 1 | Example 2 | Example 3 | Example 4 | Example 5 | Example 6 | Example 7 | Example 8 | Example 9 |
|---|---|---|---|---|---|---|---|---|---|---|---|---|
| Silicone oils | Alkyl-modified silicone oil 1 | 320° C. | — | 70 | 70 | 70 | 50 | 90 | 15 | | | 70 |
| | Alkyl-modified silicone oil 2 | >350° C. | — | | | | | | | 70 | | |
| | Aryl-modified silicone oil | 292° C. | — | | | | | | | | 70 | |
| | Dimethyl silicone | 229° C. | — | | | | | | | | | |
| Fatty acid ester-based solvents | Methyl laurate | 262° C. | 13 | 30 | | | | | | | | |
| | Isooctyl stearate | — | 26 | | 30 | | 50 | 10 | 85 | 30 | 30 | 30 |
| | 2-hexyldecyl myristate | — | 30 | | | 30 | | | | | | |
| | Ethyl heptanoate | 189° C. | 9 | | | | | | | | | |
| | Isostearyl palmitate | — | 34 | | | | | | | | | |
| | Total | | | 100 | 100 | 100 | 100 | 100 | 100 | 100 | 100 | 100 |
| | Clear file waviness | | | S1 | S1 | S1 | S2 | S1 | S2 | S1 | S1 | S1 |
| | Wetting characteristics of ink on nozzle plate | | | S | S | A | S | A | S | S | A | S |
| | Image density (surface density) | | | A | S | S | S | S | S | S | S | S |

(1*): Number of carbon atoms in fatty acid ester-based solvent

TABLE 3

| Units: % by mass | | Comparative Example 1 | Comparative Example 2 | Comparative Example 3 | Comparative Example 4 | Comparative Example 5 |
|---|---|---|---|---|---|---|
| Pigments | Carbon black 1 | 5 | 5 | 5 | 5 | 5 |
| | Carbon black 2 | | | | | |
| Pigment dispersants | Solsperse 18000 | 5 | 5 | 5 | 5 | 5 |
| | Solsperse 13940 | | | | | |
| | Solvent | 90 | 90 | 90 | 90 | 90 |
| | Total (% by mass) | 100 | 100 | 100 | 100 | 100 |

| Units: % by mass | | Boiling point | Carbon number (*1) | Comparative Example 1 | Comparative Example 2 | Comparative Example 3 | Comparative Example 4 | Comparative Example 5 |
|---|---|---|---|---|---|---|---|---|
| Silicone oils | Alkyl-modified silicone oil 1 | 320° C. | — | 70 | 70 | | | |
| | Alkyl-modified silicone oil 2 | >350° C. | — | | | | | |
| | Aryl-modified silicone oil | 292° C. | — | | | | 100 | |
| | Dimethyl silicone | 229° C. | — | | | | | 70 |
| Fatty acid ester-based solvents | Methyl laurate | 262° C. | 13 | | | 100 | | |
| | Isooctyl stearate | — | 26 | | | | | 30 |
| | 2-hexyldecyl myristate | — | 30 | | | | | |
| | Ethyl heptanoate | 189° C. | 9 | 30 | | | | |
| | Isostearyl palmitate | — | 34 | | 30 | | | |
| | Total | | | 100 | 100 | 100 | 100 | 100 |
| | Clear file waviness | | | S2 | S1 | B | S1 | S1 |
| | Wetting characteristics of ink on nozzle plate | | | S | B | S | B | S |
| | Image density (surface density) | | | B | S | S | S | B |

(1*): Number of carbon atoms in fatty acid ester-based solvent

As shown in Table 2, with the inks of Examples 1 to 9, each of which used a silicone oil having a boiling point higher than 250° C. and a fatty acid ester-based solvent having 10 to 30 carbon atoms, clear file deformation was prevented, and the wetting characteristics of the ink on the nozzle plate and the image density were able to be improved.

In Comparative Example 1, the number of carbon atoms in the fatty acid ester-based solvent was a low value of 9, and the image density deteriorated. In Comparative Example 2, the number of carbon atoms in the fatty acid ester-based solvent was a very high value of 34, and the wetting characteristics of the ink on the nozzle plate worsened. In Comparative Example 3 which did not use a silicone oil, the clear file waviness worsened. In Comparative Example 4 which did not use a fatty acid ester-based solvent, the wetting characteristics of the ink on the nozzle plate worsened. In Comparative Example 5 in which the boiling point of the silicone oil was less than 250° C., the image density deteriorated.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising a colorant and a non-aqueous solvent, wherein
the non-aqueous solvent contains a silicone oil having a boiling point higher than 250° C., and a fatty acid ester-based solvent having 10 to 30 carbon atoms.

2. The oil-based inkjet ink according to claim 1, wherein the silicone oil contains an alkyl-modified silicone oil.

3. The oil-based inkjet ink according to claim 1, wherein an amount of the silicone oil is at least 15% by mass relative to a total mass of the non-aqueous solvent.

4. The oil-based inkjet ink according to claim 1, wherein the fatty acid ester-based solvent has 14 to 28 carbon atoms.

5. The oil-based inkjet ink according to claim 1, wherein an amount of the silicone oil is at least 55% by mass relative to a total mass of the non-aqueous solvent, and an amount of the fatty acid ester-based solvent is at least 20% by mass relative to a total mass of the non-aqueous solvent.

6. The oil-based inkjet ink according to claim 1, wherein an amount of the silicone oil is not more than 95% by mass relative to a total mass of the non-aqueous solvent.

7. The oil-based inkjet ink according to claim 1, wherein the fatty acid ester-based solvent comprises a compound that is liquid at 23° C.

8. The oil-based inkjet ink according to claim 1, wherein the viscosity of the oil-based inkjet ink at 23° C. is within a range from 5 to 30 mPa·s.

\* \* \* \* \*